Jan. 22, 1957  H. S. HARRISON  2,778,388
TIRE INFLATING MACHINE
Filed March 31, 1953  5 Sheets-Sheet 1
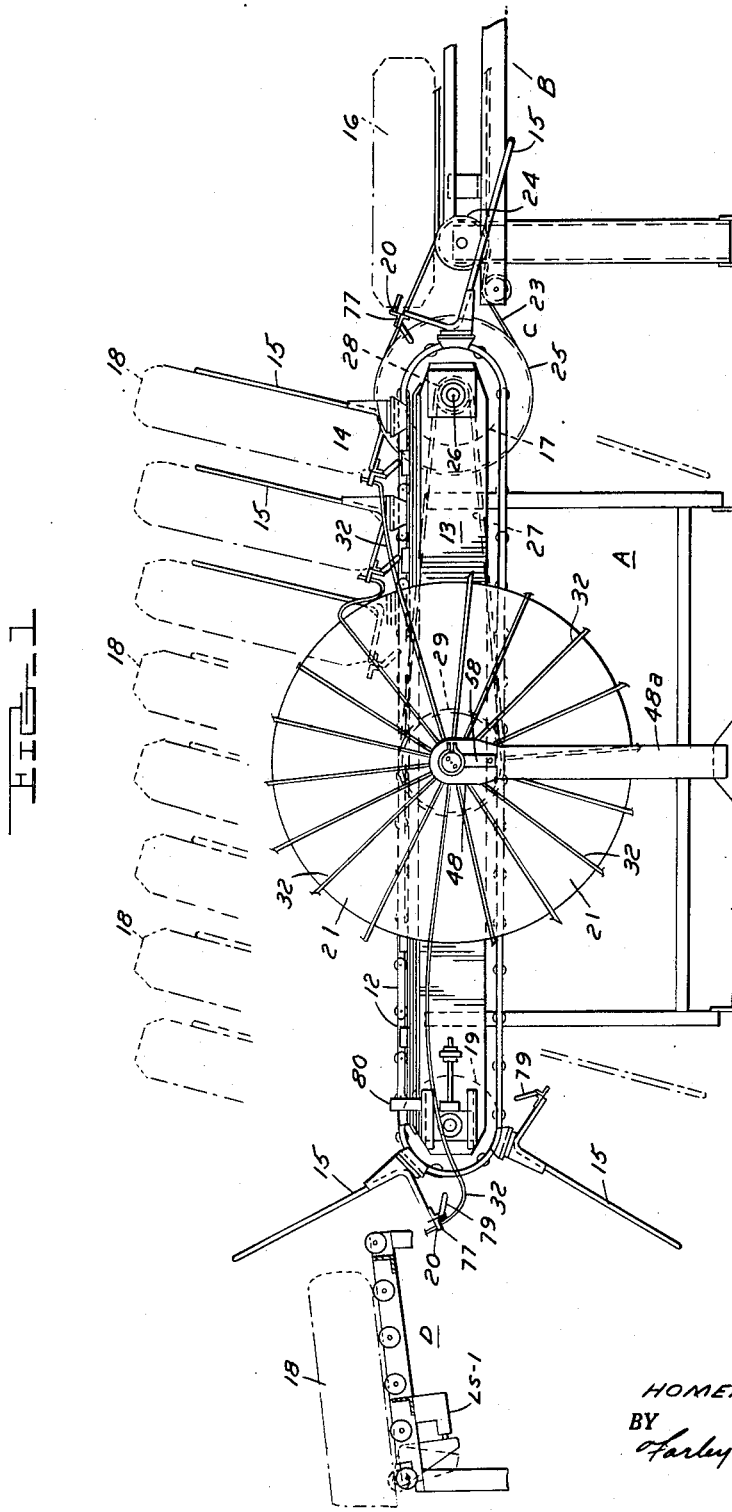
INVENTOR.
HOMER S. HARRISON
BY
Farley Forster & Farley
ATTORNEYS

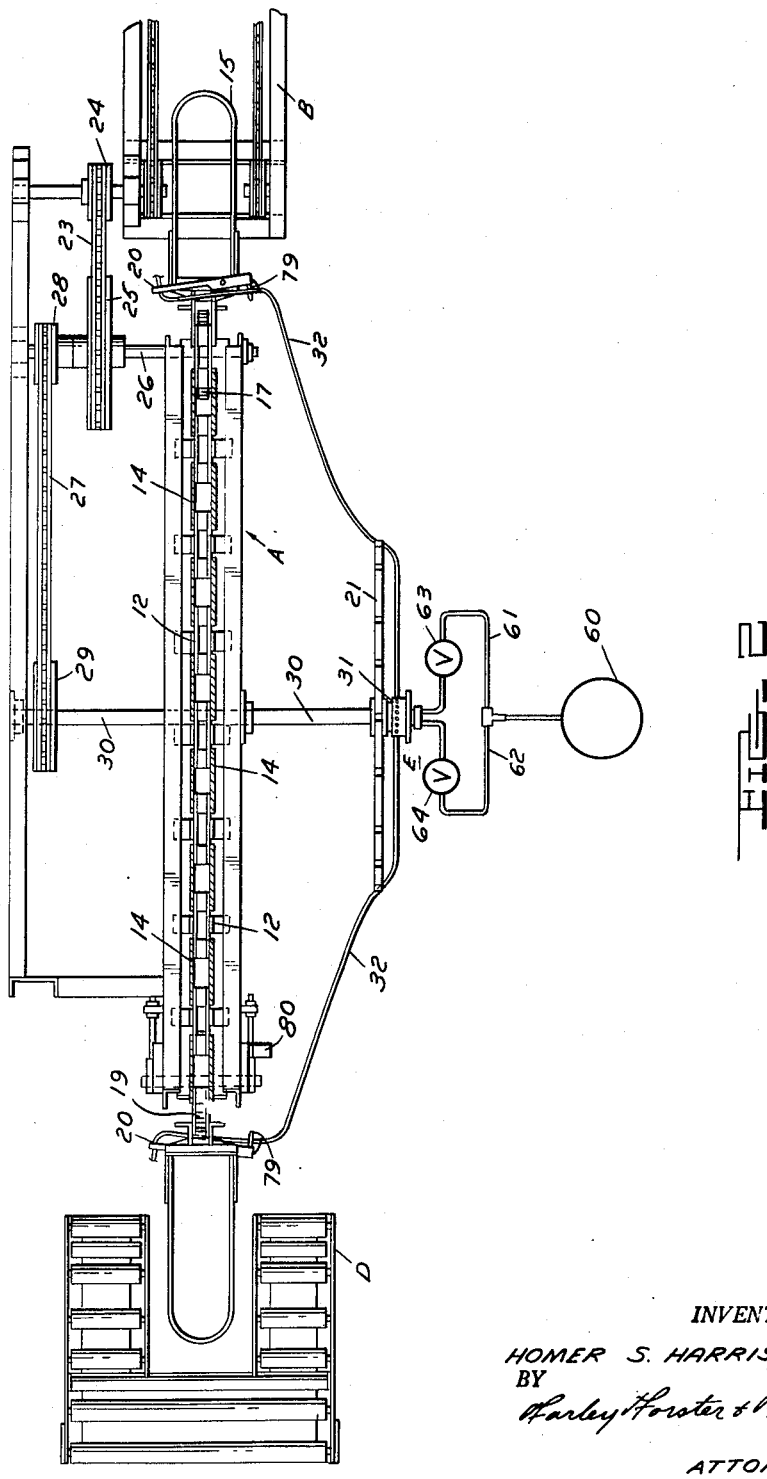

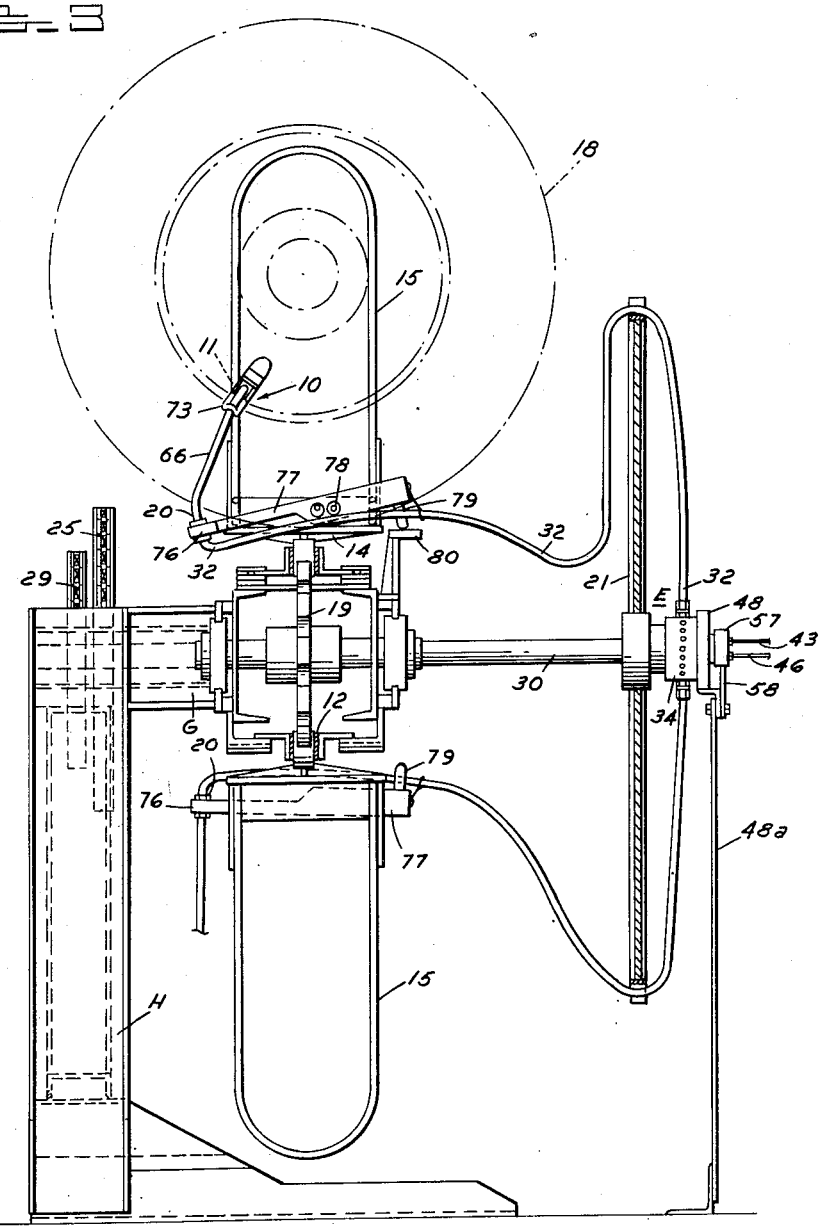

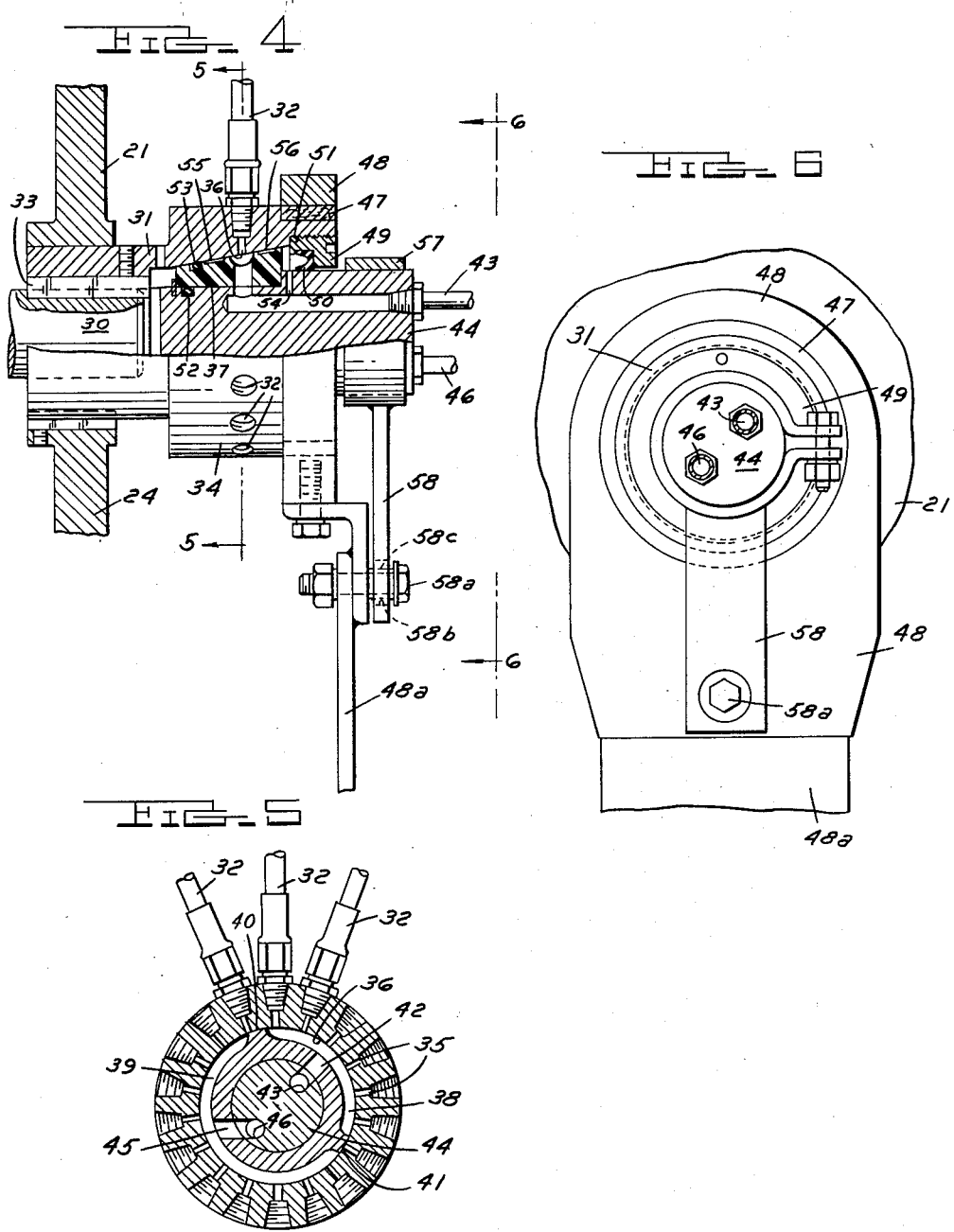

Jan. 22, 1957 H. S. HARRISON 2,778,388
TIRE INFLATING MACHINE
Filed March 31, 1953 5 Sheets-Sheet 5
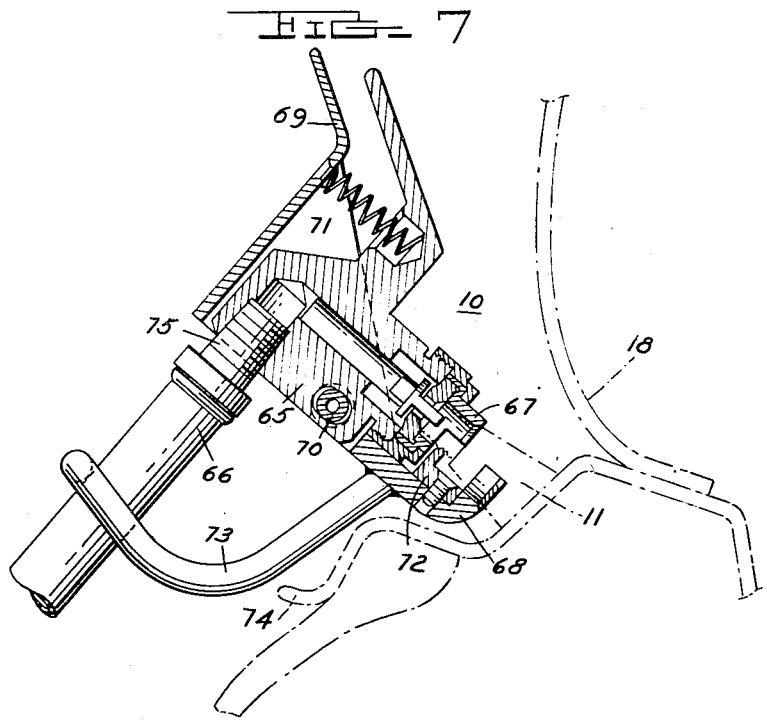
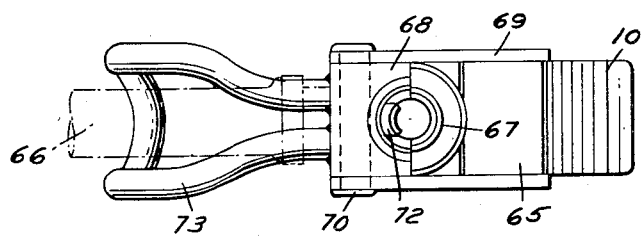
INVENTOR.
HOMER S. HARRISON
BY
ATTORNEYS United States Patent Office 2,778,388
Patented Jan. 22, 1957

2,778,388

TIRE INFLATING MACHINE

Homer S. Harrison, Detroit, Mich., assignor to Allied Steel and Conveyors, Inc., Detroit, Mich., a corporation of Michigan Application March 31, 1953, Serial No. 345,981

13 Claims. (Cl. 141—101)

This invention relates to an automatic tire inflating machine and more particularly to a conveyor type of machine wherein wheels with tires to be inflated may be loaded at one end of the conveyor, coupled with tire inflating apparatus and discharged from the conveyor fully inflated to a desired predetermined pressure.

A tire inflating machine of this general character is disclosed in my copending application Serial No. 215,736, U. S. Patent No. 2,702,149, as to which the present application is an improvement thereover.

As in my prior construction, the present embodiment includes apparatus for holding an air chuck in operative engagement with the valve stem of a tire, apparatus for leading air pressure simultaneously to a plurality of air chucks, such chucks being connected to a plurality of tires simultaneously on the conveyor throughout the movement of the tires from one end of the conveyor to the other, and apparatus for changing the pressure led to the air chuck at an intermediate point along the conveyor travel.

As pointed out in said prior application a number of inherent problems are involved in providing a satisfactory tire inflating machine. One serious problem arises from the fact that the rate of flow of air through an orifice such as the valve stem of a tire tube varies with the pressure differential between the source of pressure and the tire pressure. Thus, if the main supply pressure were maintained at a value equal to the final desired tire pressure, flow of air would be so slow as to require an exorbitant amount of time and an impracticable length of conveyor in order to handle large volume requirements, for example, as encountered in an automobile assembly plant.

On the other hand, if a high pressure (e. g., several times final tire pressure) is maintained at the source and some form of timing device is relied upon to limit the volume to that required for final desired tire pressure, commercial variations in the effective valve orifices render it impossible to obtain sufficiently uniform tire pressures throughout a production run. The problem of relying on a high pressure plus a timing device is even more acute where, as in the normal case, tires of different sizes are required to be handled at random in a single inflating machine.

On the other hand, the provision of a pressure control valve in the air chuck which would permit a wide-open flow of high pressure until a predetermined pressure in the tire is reached is an extremely difficult if not an inherently impracticable solution to the problem since it is impossible to measure directly and accurately the pressure within a tire from the outside of the tire valve while air is flowing through the valve because of the pressure differential on either side of an orifice under conditions of flow. Pressure control mechanism which would at intervals shut off the flow while the tire pressure is measured might be employed but would of necessity introduce complexities and expense from a manufacturing standpoint particularly where it is necessary to provide for simultaneous inflation of a large number of tires.

In my aforementioned prior application, an answer to this general problem was provided through the use of two alternate supply pressures and mechanism for converting from one to the other at an intermediate point in the conveyor travel, a high supply pressure being employed during the first portion of inflation which was timed through conveyor travel to provide an average tire pressure equal to the final desired pressure together with a change at an intermediate point in conveyor travel to a source of pressure equal to the final desired pressure allocating a final portion of conveyor travel to the correction of any error in the pressure arising from commercial variations in valve orifices or from differences in tire sizes.

By using such combination of alternate supply pressures it was found possible to arrive at a consistently accurate final tire pressure with a practicable length of conveyor divided, for example, into approximately equal portions of fast inflation with high pressure supply and error correction at the lower final pressure.

In order to provide for conversion from high to low pressure at an intermediate point in conveyor travel, my prior application disclosed the use of two flexible manifold hose lines adapted to move in an endless path with the conveyor travel for respectively carrying high and final pressure. A pair of high and final pressure feed lines were connected to the manifold supply lines, the other ends of which were connected to a centrally located reel adapted to wind and unwind the feed lines as required. The manifold supply lines were each coupled to a plurality of hose outlets for a plurality of tires simultaneously carried on a conveyor with a four-way valve interposed at the juncture between each of the manifold supply lines and each outlet hose, and mechanism was provided for connecting the high pressure manifold line to each individual outlet line throughout the first portion of conveyor travel together with automatic means at an intermediate point in the conveyor travel for rotating each four-way valve to a final pressure position for the final portion of conveyor travel.

The present embodiment, while utilizing the same general principle of two-pressure-stage tire inflation, greatly simplifies the mechanical construction for accomplishing such filling through elimination of the two moving manifold pressure lines, the two pressure lead lines for supplying pressure to the manifold lines, the reel mechanism for winding and unwinding such feed lines, as well as the individual four-way valves for each pressure outlet and the mechanism for automatically shifting such valves at different points of conveyor travel.

In lieu thereof, the present embodiment employs a centrally located annular manifold outlet housing with individual hose outlet connections for the individual tires, which outlet housing rotates about a fixed axis making one cycle with each complete conveyor cycle. The individual hose connection outlets communicate with an internal bore in the manifold housing and with a stationary internal pressure supply distributor having two pressure chambers supplied from respective high and final pressure sources, each communicating with a plurality of manifold pressure outlets throughout a predetermined arc of travel.

In the embodiment of said prior application, wheels were carried flat on the conveyor necessitating the use of pressure lead lines of substantial length to permit movement of connections with the manifold lines to the extremities of the conveyor thereby necessitating the use of a somewhat complex reel system for winding and unwinding the pressure lead lines as required during the complete cycle of such connecting points around the entire path of the conveyor.

In the present embodiment, this requirement is avoided by providing conveyor mechanism for carrying the wheels on edge during the inflation of the tires, thereby greatly reducing length of the required conveyor, together with the use of a simple rotating disk concentric and rotating with the aforementioned air distributor housing which disk is adapted to hold each individual air hose at an intermediate point in its length and adequately minimize the "looping" of each air line at the center of the conveyor. The present embodiment also incorporates improved means for holding the individual air chucks in operative engagement with the valve stems of a tire during inflation together with automatic means for removing the air chuck at the delivery end of the conveyor after the filling cycle is complete.

Accordingly, it will be understood that the principal object of the present invention is to provide improved means for distributing air to a plurality of individual tire hose lines in a tire inflating machine which will meet the requirements for a two-stage filling operation at initial high and subsequent final pressures.

Another object is to provide improved means for shortening the required length of the conveyor and simplifying the means for conducting air to the individual tires throughout the length of conveyor travel.

Another object is to provide improved means for holding an air chuck in effective engagement with individual valve stems during the filling cycle of conveyor travel together with improved automatic means for removing such air chuck at the end of the filling operation.

These and other objects will be more apparent from the following description of a particular embodiment of my invention together with an examination of the drawings disclosing such embodiment wherein:

Fig. 1 is a side elevation of the complete tire inflating machine;

Fig. 2 is a plan view of said tire inflating machine;

Fig. 3 is an end view taken along the line 3—3 of Fig. 1;

Fig. 4 is a sectional view of the manifold air distributor assembly taken along the line 4—4 of Fig. 1;

Fig. 5 is a sectional view through said assembly taken along the line 5—5 of Fig. 4;

Fig. 6 is an end elevation of said manifold assembly taken along the line 6—6 of Fig. 4;

Fig. 7 is a sectional view of an individual air chuck and holding device; and

Fig. 8 is an end view of said air chuck assembly taken along the line 8—8 of Fig. 7.

Referring to Figs. 1, 2 and 3, it will be seen that the tire inflating machine A receives wheels delivered horizontally from the conveyor B of a tire mounting machine, not shown, at which point an air chuck 10 is manually coupled to a tire valve stem 11 as later described in detail. An individual wheel rack, generally indicated as C, is rigidly mounted on each alternate chain link 12 of the inflating machine conveyor 13 by means of a bracket 14 which carries a tire engaging member 15 adapted to engage a horizontal wheel 16 as the associated chain link passes around the sprocket 17 and raise such wheel to a near vertical position as shown at 18 for travel across the horizontal reach of the tire inflating conveyor. Movement of the wheel rack C around the forward sprocket 19 deposits the wheel in a horizontal position on the gravity roller bed D from which the wheel moves to other appropriate conveying means not shown. The valve stem is automatically uncoupled from the air chuck by means later described before it leaves the wheel rack at the end of the conveyor travel.

By thus adapting the tire inflating conveyor to carry the wheels "on edge" the over-all length of the conveyor may be reduced to approximately one third of the length required for horizontal conveyance as disclosed in said prior application thereby not only saving over-all plant space but greatly facilitating a solution to the problem of conducting air to the individual wheels during their entire travel across the conveyor. With such reduced conveyor length it has been found possible to provide a flexible air line hose from the centrally located manifold air distributor E to a coupling member 20 mounted on each tire rack C without incurring undue looping of the air line at the center of conveyor travel by the simple means of a large diameter disk 21 adapted to rotate at conveyor speed. From the perimeter of such disk, the individual air lines are suspended at points leading substantially directly toward the end of the conveyor when the coupling 20 is farthest from the distributor E, which points will move to a level at the top of the disk 21 substantially above the coupling 20 when they reach the center of conveyor travel where the distance between the coupling and distributor is at a minimum thereby taking up a substantial portion of the slack in the air lines reducing the loop between the edge of the disk 21 and the coupling 20 to a manageable length which will not tangle or interfere with the operation of the machine.

In order to provide clearance for return of the wheel racks on the underside of the conveyor and for the hose lines leading to the wheel racks, the conveyor is mounted with a cantilever suspension from an offset frame H, the sprocket drives being laterally located along the offset frame with a cross shaft 30 for driving the rotating parts of the air distributing mechanism. It will be understood that the drive for the inflating machine conveyor is synchronized with the conveyor of the tire mounting machine delivering wheels thereto through a drive chain 23 passing from a small diameter sprocket 24 at the delivery end of the tire mounting conveyor B to a large diameter speed reducing sprocket 25 coupled by shaft 26 to the driving sprocket 17 of the tire inflating conveyor and that the disk 21 is synchronized to make one complete revolution with every complete cycle of the conveyor chain 13 through a drive chain 27 passing from a small diameter sprocket 28 on the shaft 26 to a large diameter sprocket 29 which drives the shaft 30, disk 21 and manifold housing 31 to which each of the air lines 32 is coupled as best shown in Fig. 4.

Referring now to the construction of the manifold air distributor assembly shown in Figs. 4, 5 and 6, it will be seen that the shaft 30 is keyed at 33 to the distributor housing 31 which incorporates an annular manifold outlet body 34 provided with a plurality of radial outlet ports 35 corresponding in number to the total number of wheel racks on the entire tire inflating machine. Each of said outlet ports communicates with an annular tapered bore 36 in the center of the body 34 within which a stationary tapered distributor sleeve 37, preferably made of bonded graphite or other suitable material having adequate self-lubricating and sealing properties, is fitted with a taper matching that of the bore 36. The sleeve 37 is provided with a pair of recessed air passages 38 and 39 communicating respectively with a plurality of outlet ports 35 throughout predetermined arcs of travel, said air passages being sealed from each other by a pair of lands 40, 41 which are in sealing contact with the bore 36 of the manifold body. The passage 38 is provided with high pressure through a port 42 in the sleeve 37 and a communicating port 43 in a cylindrical member 44 serving to mount the sleeve 37 which likewise remains stationary. Similarly, the final pressure passage 39 is supplied through a second port 45 and communicating port 46 in the respective sleeve and cylindrical mounting members.

The annular body 34 rotates within a suitable bushing 47 in a fixed bearing 48 mounted on a stationary pedestal 48a and is fixed to a rotating bushing 49 which carries a suitable air seal 50 for the cylindrical member 44. O-ring seals are preferably provided as indicated at 51, 52 and 53 to prevent leakage out of the manifold assembly. A port 54 conducts air pressure from the high pressure port to the outer end of the distributor sleeve 37 thereby providing an automatic pressure loading of such sleeve into sealing contact with the bore 36 whenever the machine is in operation without the necessity of using spring or other loading means. The tapered angle of the bore 36 and matching outer surface of the sleeve 37 is preferably in the order of a minimum nonsticking angle in order to give a high effective sealing pressure and the sleeve 37 is preferably relieved on either side of sealing lands 55 and 56 in order further to provide a high sealing contact pressure. The outer end of the cylindrical member 44 is adjustably held against rotation by a spring clamp 57 which is restrained against rotation by an arm 58 loosely connected to the pedestal 48a by a bolt 58a passing through a large clearance hole 58b which tightens against a clearance spacer sleeve 58c. Such connections permit the entire nonrotating portion of the distributor assembly to float into axial alignment and pressure contact with the conical bore 36 of the manifold body piloted solely by the sealing contact between the distributor sleeve 37 and such conical bore.

Thus it will be seen that by coordinating the arcuate extension of the respective high pressure and final pressure passages 38 and 39 with the speed of conveyor travel, a two-stage filling cycle of desired proportions may be provided and that a final adjustment in the position of the high pressure cutoff land 40 may be made by loosening the clamp 57 and rotating the cylindrical member 37 after the machine has been placed in operation in order to provide maximum accuracy for the run of tires being handled by the machine. This permits the "soaking" period at final pressure to be minimized for any desired accuracy tolerance of final tire pressure.

As shown in Fig. 2, air pressure from a single high pressure source 60 may be led to branch connections 61 and 62 and through suitable high and final pressure regulators 63 and 64 to the corresponding ports 43 and 46 in the pressure distributor assembly.

From the above description it will be seen that swivel hose connections are entirely avoided and that provision for sealing against leakage through sliding contact surfaces is entirely confined to the provision of adequate sealing between the rotating and stationary members of the distributor assembly described above.

Referring now to the construction of the air chuck and clamp assembly shown in Figs. 7 and 8, the internal air valve construction communicating with the internal members of the tire valve assembly are conventional as employed in commercial air chucks held by hand in operating engagement with the tire valve stem and will not be described. The clamping assembly for permitting the air chuck to be rapidly applied to the tire valve stem clamp in position and automatically released at the end of the conveyor travel incorporates a number of novel improvements over the similar device disclosed in my aforementioned earlier application which will be understood from the following description. The main body 65 of the air chuck 10 is connected by a flexible hose 66 with a fitting 20 associated with the tire rack C and the lower end of the air chuck which engages the tire valve stem is provided with a semitubular member 67 adapted to engage one side of the upper end of the tire valve stem 11. A clamping member 68 integral with a handle portion 69 is pivotally connected at 70 to the main body 65 of the air chuck. A compression spring 71 urges the lower end of the clamping member 68 and a sharp-edged locking dog 72 associated therewith into clamping relationship with the semitubular member 67. A machine operator stationed at the loading end of the tire inflating machine, by manually pressing the handle member 69 against the spring pressure, opens the respective clamping members 67 and 72 whereupon the chuck may be applied to the tire valve stem to establish tire inflating communication therebetween, the release of the handle 69 resulting in clamping engagement with the sharp edge of the dog 72 engaging a thread on the outer surface of the tire valve stem. The assembly is constructed to permit automatic disengagement at the delivery end of the tire inflating conveyor simply through the application of tension to the inflating hose 66. Such action is accomplished by providing a guide member 73 which is rigidly associated with the clamping member 68 and is adapted to contact the metal wheel rim 74 which is employed as a reaction and camming surface. When tension is applied to the hose 66, the pull at the coupling 75 establishes a moment about the pivot 70 causing the clamping member 67 to open away from the valve stem with reaction to accommodate such opening movement being provided by the contact between the guide member 73 and rim 74. Simultaneously with such opening movement, the clamping member 68 and dog 72 are caused to be drawn away from engagement with the valve stem by the tension applied to the entire chuck assembly and the cam engagement between the guide member 73 and rim 74.

In order to effect a disengaging tension in the hose 66 at the end of the conveyor travel, the hose connection 20 is located at one end 76 of a rockably mounted lever 77 pivotally connected at 78 to the tire rack as best shown in Fig. 3. An extension 79 from the other end of the lever is adapted to engage a fixed actuating member 80 located in the path of the member 79 causing such member to articulate the lever 77 upon reaching the end of conveyor travel thereby moving the end 76 away from the valve stem of a tire and accordingly effectively automatically removing the air chuck from engagement with the valve stem.

While a particular embodiment has been described above in detail, it will be understood that numerous modifications may be resorted to within the scope of my invention as defined in the following claims.

I claim:

1. In a tire inflating machine wherein a conveyor carries a plurality of wheels with inflating apparatus coupled thereto, means for effecting a rapid initial inflation from a high pressure source and an accurate final inflation from a final lower pressure source, said means comprising a member having a plurality of outlet ports, means for connecting said outlet ports to individual wheels on said conveyor, a common inlet surface of said member intersected by said ports, means for progressively conducting high and final air pressure to isolated portions of said inlet surface communicating respectively with outlet ports associated with wheels moving in predetermined initial and final portions of their travel along said conveyor.

2. Tire inflating means as set forth in claim 1 wherein said inlet surface has the form of an endless circular ring, wherein said last-named means comprises an annular member having arcuate high and final pressure chambers adapted to communicate with isolated arcs of said inlet ring surface and wherein means synchronized with conveyor movement produce relative rotative movement between said members to establish progressive two-stage inflating action.

3. Tire inflating means as set forth in claim 1 wherein said member comprises a rotatable annular ring having radial ports extending therethrough from a common interior inlet surface to said individual wheel connecting means.

4. In a tire inflating machine wherein a conveyor carries a plurality of wheels with inflating apparatus coupled thereto, means for effecting a rapid initial inflation from a high pressure source and an accurate final inflation from a final lower pressure source, said means comprising an annular ring member having a plurality of radial ports extending therethrough, means for connecting the outlet ends of said ports to individual wheels on said conveyor, an annular pressure distributor communicating with the inlet ends of said ports, said distributor having high and final pressure chambers communicating respectively with ports associated with wheels moving in predetermined initial and final portions of their travel along said conveyor, and means synchronized with conveyor travel for producing relative movement between said ring and distributor members to progressively convert each port from high to final pressure inflation at an intermediate point in the associated wheel's travel along said conveyor.

5. Tire inflating means as set forth in claim 4 wherein said ring and distributor members are provided with matching conical engaging surfaces.

6. Tire inflating means as set forth in claim 4 wherein said ring and distributor members are provided with matching conical engaging surfaces, and air pressure means are provided to load said surfaces into sealing engagement.

7. In a tire inflating machine wherein a conveyor carries a plurality of wheels with inflating apparatus coupled thereto, means for effecting a rapid initial inflation from a high pressure source and an accurate final inflation from a final lower pressure source, said means comprising a rotatable ring member having a plurality of outlet ports, means for connecting said outlet ports to individual wheels on said conveyor, the inlet end of said ports intersecting a common interior surface, an annular distributor member adapted to engage said interior surface, high and final pressure chambers in said distributor communicating respectively with isolated arcs of said interior surface and the associated ports thereof, means synchronized with conveyor travel for rotating said ring member, and adjustable means for holding said distributor member against rotation whereby high pressure may be conducted to wheels during their initial portion of conveyor travel and up to a transition point adjustably determined by the positioning of said distributor, and whereby final pressure may be conducted to said wheels during their final travel on the conveyor.

8. Tire inflating means as set forth in claim 7 wherein said ring and distributor members are provided with matching conical surfaces, wherein axial pressure means are provided for loading said conical surfaces into pressure sealing engagement, and wherein the means for restraining said distributor against rotation is adapted to accommodate a floating movement of the entire distributor assembly whereby freedom of axial alignment and pressure engagement of said conical surfaces may be facilitated.

9. In a tire inflating machine wherein a longitudinally extending conveyor carries a plurality of wheels with inflating apparatus coupled thereto, an air pressure distributor located centrally along the length of said conveyor, hose connections extending from said central distributor to each of the wheels carried along said conveyor, and hose suspension means comprising a rotatable annular disk axially aligned with said air distributor assembly, means synchronized with conveyor movement for rotating said disk, and means for engaging the individual hose lines at circumferentially spaced points around the perimeter of said disk.

10. In a tire inflating machine wherein a longitudinally extending endless conveyor carries a plurality of wheels with inflating apparatus coupled thereto across the length of said conveyor, a rotatable air supply member located centrally along the length of said conveyor, individual hose lines adapted to extend from said central supply member to each of the individual wheels carried along said conveyor, means for rotating said supply member once for each complete conveyor cycle, hose suspension means comprising an annular disk axially aligned and rotatable with said supply member, said disk extending to a height substantially above conveyor level, means for engaging said individual hose lines at circumferentially spaced points around the perimeter of said disk, the hose lines leading to the ends of said conveyor being engaged near the horizontal center line of said disk, and the hose lines leading to the center of said conveyor being engaged near the vertical center line of said disk.

11. In a tire inflating machine, an endless conveyor chain passing over sprockets at either end of the machine, an offset base and cantilever frame for supporting said conveyor from one side, individual wheel racks carried along the surface of said conveyor, each of said racks including an extension adapted to engage the side of a wheel and support it in a substantially upright position during conveyance along the length of said inflating machine, air distributing means including individual hose lines adapted to be simultaneously coupled with a plurality of wheels during their conveyance along the length of said tire inflating machine, said air distributing means and hose lines being located on the opposite side of said conveyor from said supporting frame.

12. In a tire inflating machine, an endless conveyor chain passing over sprockets at either end of the machine, an offset base and cantilever frame for supporting said conveyor from one side, individual wheel racks carried along the surface of said conveyor, each of said racks including an extension adapted to engage the side of a wheel and support it in a substantially upright position during conveyance along the length of said inflating machine, air distributing means including individual hose lines adapted to be simultaneously coupled with a plurality of wheels during their conveyance along the length of said tire inflating machine, said air distributing means including a rotatable member having outlet connections for each of said hose lines, a shaft extending laterally through the center of said conveyor for driving said rotatable member, and synchronized drive means for said conveyor and said shaft mounted on said offset frame.

13. In a tire inflating machine, a conveyor, a plurality of racks on said conveyor for supporting tire-bearing wheels in closely spaced relation with the wheel axes extending in substantial parallelism with the conveyor path of travel, and inflation apparaus for the tires borne by said wheels, including an air distribution manifold connected to a source of air at superatmospheric pressure and positioned medially of the conveyor, and individual hoses connecting each of the tires to said manifold.

References Cited in the file of this patent

UNITED STATES PATENTS

| | | |
|---|---|---|
| 1,453,022 | Phillips | Apr. 24, 1923 |
| 1,484,342 | Schweinert | Feb. 19, 1924 |
| 1,493,121 | McAneny | May 6, 1924 |
| 2,295,237 | Rothwell | Sept. 8, 1942 |
| 2,296,868 | Pechy | Sept. 29, 1942 |
| 2,539,055 | Brooke | Jan. 23, 1951 |
| 2,702,149 | Harrison | Feb. 15, 1955 |